United States Patent [19]
O'Mera

[11] 3,766,936
[45] Oct. 23, 1973

[54] WATER CONTROL APPARATUS RESPONSIVE TO LEAKAGE OR OVERFLOW CONDITIONS

[76] Inventor: John F. O'Mera, P.O. Box 184, 1157 Garden Ave., Osburn, Idaho 83849

[22] Filed: Jan. 21, 1972
[21] Appl. No.: 219,619

[52] U.S. Cl. .............................. 137/312, 137/408
[51] Int. Cl. ........................ E03c 1/00, F16k 37/00
[58] Field of Search................... 137/312, 313, 314, 137/403, 405, 408; 220/1 C

[56] References Cited
UNITED STATES PATENTS
| | | | |
|---|---|---|---|
| 2,531,159 | 11/1950 | Rowell............................ | 137/312 X |
| 2,708,435 | 5/1955 | Lewis............................... | 137/408 X |
| 2,724,401 | 11/1955 | Page ..................... | 137/403 |
| 3,102,654 | 9/1963 | Millman et al...................... | 220/1 C |

FOREIGN PATENTS OR APPLICATIONS
431,941  11/1911  France................................. 137/408

Primary Examiner—Martin P. Schwadron
Assistant Examiner—Richard Gerard
Attorney—Greek Wells et al.

[57] ABSTRACT

A household or industrial water control apparatus utilized to prevent flood damage by automatically shutting off the main water supply when flood conditions exist. A system of strategically placed collection tubes direct overflow water to the apparatus. The water is received in a vessel which pivots under the weight of the water. As the vessel pivots, an electrical contact is made to activate a solenoid-operated gate valve to close off the main water supply. Various switches at a control box allow an attendant to reset the control apparatus and operate the gate valve.

4 Claims, 7 Drawing Figures 3,766,936

WATER CONTROL APPARATUS RESPONSIVE TO LEAKAGE OR OVERFLOW CONDITIONS

BACKGROUND OF THE INVENTION

Water overflow, due to negligence, pipe leakage or a malfunction of control valves, can cause extensive damage to buildings and their contents if not detected and repaired quickly. This problem often arises in homes where unattended automatic washing machines malfunction, allowing water to overflow and flood the surrounding area.

Prior patents for controlling or sensing fluid overflow describe water control or level warning apparatus utilizing floats to activate various alarms, as illustrated in U.S. Pat. Nos. 3,310,795 and 2,184,605 to David and Roberts, or to shut-off equipment as seen in U.S. Pat. No. 3,185,789 to Gunther.

Stanley U.S. Pat. No. 2,362,731 shows a float operated device that shuts off a supply motor to a tank when the liquid level reaches a selected volume.

Lee U.S. Pat. No. 1,348,016 discloses a device for controlling a pump to prevent water in the hold of a vessel from rising above a specific height.

As may be seen upon examination of the above cited art, none comprise a flood control and system adapted to control water overflow in any specific area or combination of areas of a building by automatically shutting off the main water supply to the building.

The present invention is adapted to receive overflow water from any of a combination of areas in a building structure through a system of collection tubes. The tubes may extend from locations adjacent sinks, baths, washing machines, toilets or other areas susceptible to flooding due to overflow or leakage of water pipes. Water collected by the tubes is directed into a vessel which is pivotably supported by a shaft having electrical contacts fixed to one end thereof. In a normal inoperative position, the vessel extends horizontally over the axis of the shaft. Counterweights, fixed to the vessel, extend from the other side of the axis to maintain the horizontal position of the vessel. The weight of water draining from the tubes into the vessel, however, upsets this balance and causes the vessel to pivot downwardly. This movement rotates the shaft, bringing the contacts into engagement with a pair of electrical connectors. This contact completes a circuit, operating a solenoid to close a gate valve in the main water supply. A second circuit is then completed by the moving contacts to activate an indicator located on a control panel. The water supply will remain closed until an attendant manually activates solenoids to reset the water control device and reopen the main water supply. Water drained through the collection tubes and the water control device during overflow is directed to the building's drainage system.

SUMMARY OF THE INVENTION

A water control apparatus is described for monitoring area flooding of water within building structures. The apparatus includes a drainage means for directing flood water from the monitored area into a pivotable receiving vessel below. The vessel is pivotable between an inoperative, empty position and an operative position which is assumed after a predetermined amount of water is received in the vessel. The vessel provides electrical contacts operatively connected thereto for momentarily activating a solenoid operated gate valve to shut off the main water supply in response to the pivotal movement of the vessel. The contacts are designed to operate the gate valve solenoid momentarily as the vessel pivots intermediate the inoperative and operative positions. A signal means is also activated by the contacts while the vessel is at its operative position. The apparatus further includes a discharge means for receiving water from the vessel while in its operative position.

A reset means is operatively connected to the vessel for pivoting the vessel from the operative position to the inoperative position.

A first object of my invention is to provide a water control apparatus that will automatically shut off the main water supply and drain flooded areas in a building or structure.

Another object is to provide such an apparatus that is adapted to monitor flooding conditions in several locations from a single central unit.

An additional object is to provide such an apparatus that is simple in operation and thereby relatively maintenance free.

A further object is to provide such an apparatus that is adjustable, allowing individual users to determine what amount of overflow water may constitute flood conditions.

These and further objects and advantages will become evident from the following disclosure, taken with the accompanying drawings which illustrate a preferred form of the invention.

DESCRIPTION OF THE PREFERRED EMBODIMENTS

Figure 1:
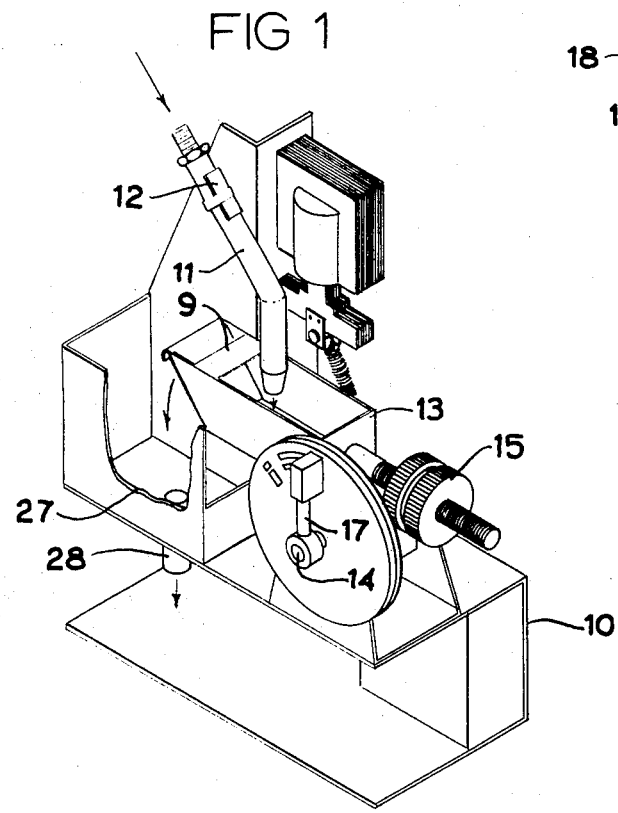
FIG. 1 is an isometric view of the water control apparatus.
Figure 2:
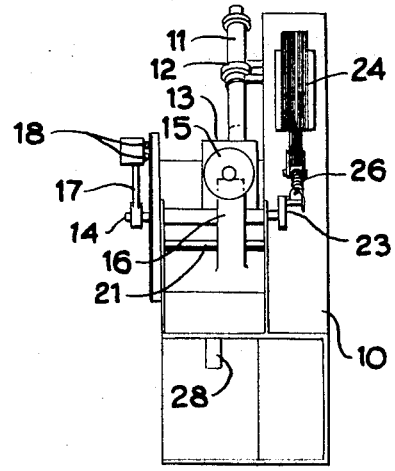
FIG. 2 is an end elevation view of the water control apparatus as seen from the right in FIG. 1.
Figure 5:
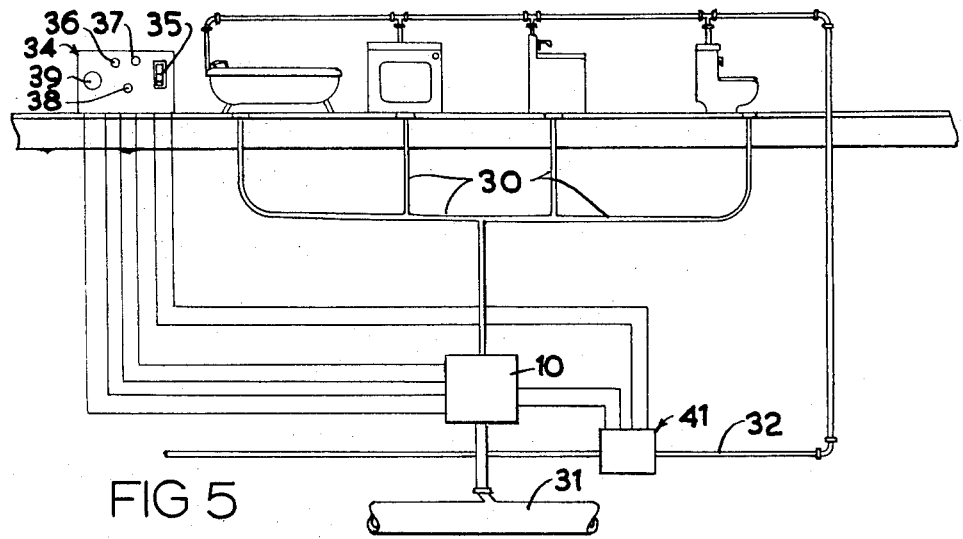
FIG. 5 is a schematic view illustrating positioning of the apparatus and location of the collection tubes.
Figure 6:
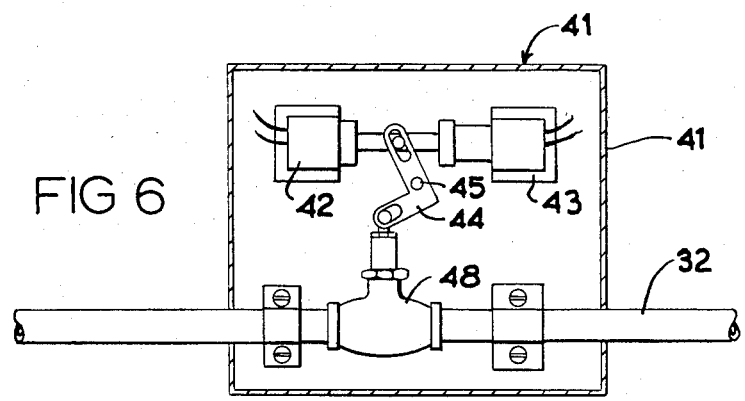
FIG. 6 is a partially sectioned elevation view of the solenoid activated gate valve.

Referring now to FIG. 1 of the drawings, the water control apparatus may be seen generally comprising a framework or base 10 supporting an input spout 11 for directing overflow water into a pivotable vessel 13. Vessel 13 pivots about the axis of a shaft 14 which has means affixed thereto for completing circuits to activate a solenoid operated gate valve mechanism 41 (FIG. 6) and an indicator lamp 39 (FIG. 5).

Input spout 11 is removably mounted to an upright portion of base 10 by a spring clip 12 which is angularly positioned to locate the spout discharge opening directly above vessel 13.

Vessel 13, as seen in FIGS. 1-4 comprises a somewhat rectangular shaped container defined by a bottom wall, two longitudinal sides, an inclined front wall, and an upright back wall.

Shaft 14 is rigidly fixed to vessel 13 along the line of intersection of the vessel bottom and back walls. Base 10 rotatably journals shaft 14 along a transverse horizontal axis thereby allowing vessel 13 to pivot about that axis between the inoperative and operative positions illustrated in FIGS. 3 and 4 in solid and phantom lines respectively.

Vessel 13 is normally held at the horizontal, inoperative position on shaft 14 by the downward bias of a self-locking pair of counterweights 15 threadably engaged on an elongated shaft which is affixed to the back end of vessel 13. The counterweights 15 may be adjusted longitudinally along the shaft to selectively offset the balance about shaft 14, allowing the user to determine the amount of water necessary to tip vessel 13 to the operative position shown in dotted lines in FIGS. 3 and 4. A stop 16 is positioned adjacent the inoperative position of the counterweight shaft to prevent the vessel 13 from pivoting upwardly.

Figure 3:
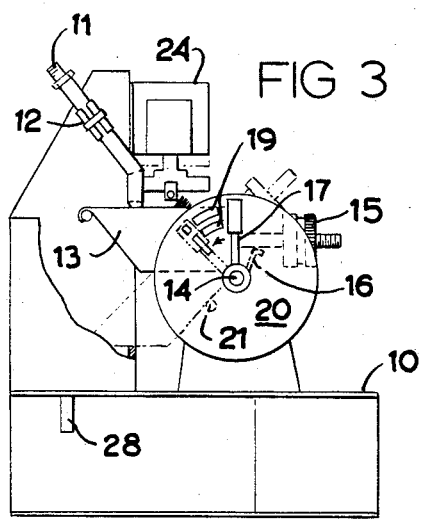
FIG. 3 is a side elevational view of the apparatus showing the operative position of the receiving vessel in dotted lines.
Figure 4:
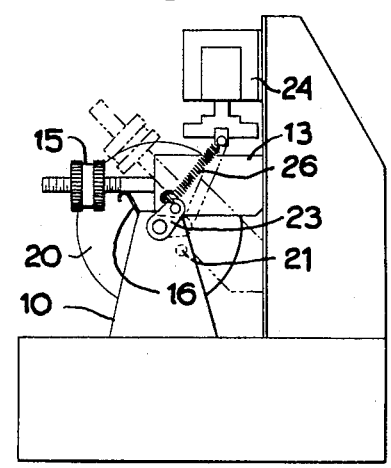
FIG. 4 is a back side elevation view of the apparatus.

Similarly, the downward arcuate movement of the vessel is limited as the bottom wall of vessel 13 comes into abutment with a transverse rod 21 when vessel 13 reaches the operative position as seen in FIG. 3.

The inclined front wall of vessel 13, when in the operative position, becomes horizontal with respect to base 10 thereby allowing water to flow from the vessel into an adjacent discharge tray 27. The water, however, is not allowed to run freely into the discharge tray. A restricted opening, formed between a plate 9 fixed transversely across vessel 13 and the lip of the vessel front wall sufficiently restricts the flow of water to insure that the vessel 13 will move to, and remain in, the operative position because of the shift of balance. Vessel 13 will remain in the operative position until an attendant remotely activates a solenoid 24 to move vessel 13 back to the inoperative position. Water will continue to flow through the vessel 13, if unattended, to be discharged through a tube 28 in a tray 27.

An arm 17 is fixed to one end of shaft 14 perpendicular to the shaft axis. A pair of electrical contacts 18 (FIG. 2) are held within an insulated block at the outermost end of arm 17. Contacts 18 are positioned to engage two separate pair of contact strips 19, 22 as vessel 13 pivots to the operative position. Strips 19, 22 are mounted to an insulated circular disc 20 and formed in arcs, the center of each being the axis of shaft 14. The radii of the arcs are similar to the distances from the shaft axis to the contacts 18.

As contacts 18 engage strips 19, an electrical circuit is completed. As the vessel continues to pivot, the circuit is broken and a second circuit is completed when contacts 18 move into engagement with strips 23 as vessel 13 is stopped at the full operative position.

A crank arm 23 is affixed to the other end of shaft 14, opposite the end mounting arm 17. Crank arm 23 is connected to the plunger of solenoid 24 through a tension spring 26. Crank 23 provides a lever arm when vessel 13 is in the operative position. Solenoid 24 may be activated to retract its plunger, thereby pivoting vessel 13 back to the inoperative position through its connection with crank arm 23. Spring 26 is utilized to dampen the abrupt action of solenoid 24, thereby preventing possible damage to vessel 13 as the counterweight shaft moves against stop 16.

As may be seen in FIG. 5, the control apparatus operates from a series of collection tubes 30 which are separate from the usual drainage system. Tubes 30 are adapted to be mounted flush to floors at low points directly adjacent appliances or utilities as shown in FIG. 5 where water leakage could occur. Although four collection tubes 30 are shown, it should be noted that more could be utilized according to need. Tubes 30 join with a common central tube which is mounted to spout 11 of the control apparatus. Water directed from any of the tubes 30 is directed through spout 11 to accumulate in vessel 13 until a sufficient amount has collected to upset the balance over the axis of shaft 14 and thereby pivot vessel 13 and the elements affixed thereto to the operative position. The water then flows from the vessel to discharge tray 27 where it is directed through a discharge tube 28 to the main drainage system 31. Since vessel 13 remains in the operative position, the flooded area may be completely drained.

During this pivotal movement of vessel 13, momentary contact is made between strips 19 and the pivoting contacts 18. A circuit is completed thereby to activate a solenoid 42 of gate valve mechanism 41 (FIG. 6) in the main water supply pipeline 32 for the area being monitored.

Gate valve mechanism 41 comprises a standard gate valve 48 secured to water supply line 32. Valve 48 is operated by a reciprocating linkage comprising a crank arm 44 pivotally mounted to a stationary pivot pin 45. Crank 44 is slidably connected to the stem of valve 48 at one end, and to the plungers of solenoids 42, 43 at the other end. Solenoid 42, when activated, pivots crank 44 to depress the valve stem, thereby shutting off the water supply. Inversely, when solenoid 43 is activated, the crank 44 is pivoted to lift the valve stem, opening the water supply through pipe 32. It may be noted that solenoids 42, 43 need only operate momentarily since valve 48 will normally remain in either set position.

As the vessel 13 reaches the full operative position, contacts 18 again complete a circuit with strips 22 to activate an indicator lamp 39 located in a control box 34. Lamp 39 visually indicates that the control apparatus has been activated and that the main water supply has been closed.

The valve 48 remains closed until solenoid 43 is activated to reopen gate valve 48. This is accomplished by an attendant who first operates a momentary contact push button switch 38 to complete a circuit to solenoid 24 thereby resetting the control apparatus to the inoperative position. He may then open valve 48 by operating a second momentary contact switch 36 which activates solenoid 43 to reopen the main water supply.

Figure 7:
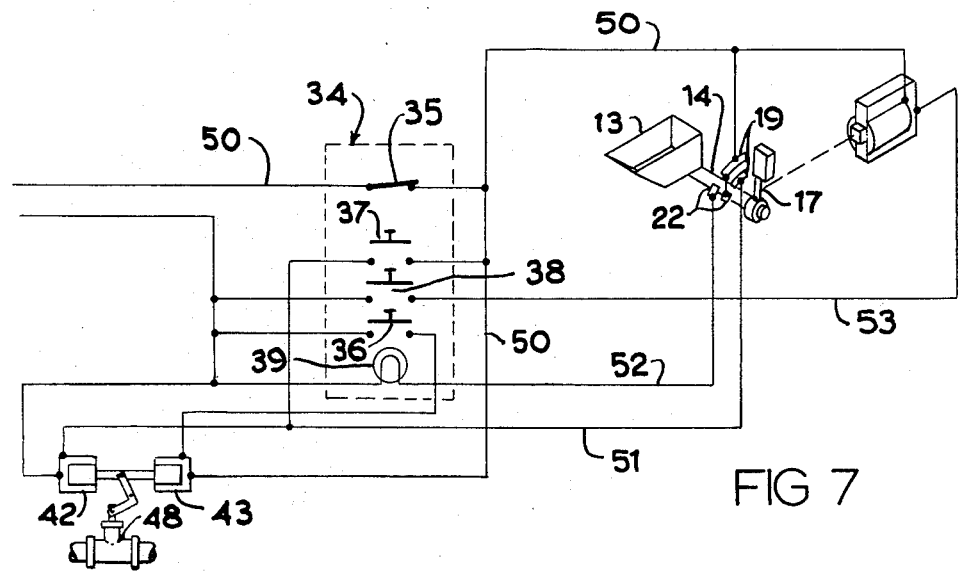
FIG. 7 is an electrical schematic illustrating the operative electrical circuitry of the apparatus.

The circuitry involved in the operation of my invention may best be seen in FIG. 7. Electrical power may be obtained either directly through connection to a household power supply or through other available emergency power sources.

A normally closed master switch 35 in a lead line 50 is utilized to cut off all power to the control apparatus for servicing or other purposes. Line 50 momentarily completes a circuit with solenoid line 51 as vessel 13, when over-balanced with overflow water, pivots contacts 18 to momentarily engage strips 19. The circuit thereby completed with lines 50 and 51 activates solenoid 42 to shut off the main water supply. As the contacts continue to move with the pivoting vessel, the cirucit comprising lines 50 and 51 is opened and a second circuit is closed as contacts 18 engage strips 22. This circuit includes line 50 and a line 52 leading to indicator lamp 39. This circuit will remain closed, operating lamp 39 until momentary contact switch 38 is operated to activate the apparatus reset solenoid 24, bringing the vessel 13 back to the inoperative position. Gate valve 48 will also remain closed until a switch 36 in a line 53 is operated to activate solenoid 43 to reopen the valve. An additional switch 37 is utilized in a line 54 to bypass the control apparatus allowing valve 48 to be closed manually.

It should be noted that switches 38 and 36 should be operated in the above described sequence. If switch 36 is operated to first reopen the water supply, solenoid 42 will again be activated to close valve 48 as contacts 18 engage strips 19 when pivoting to the inoperative position.

It may be obvious, from the above description that various changes and modifications may be made therein without departing from the scope of the invention as defined in the appended claims.

What I claim is:

1. A liquid control apparatus for monitoring area flooding within a structure where the flooding is the result of malfunction occurring in a device or conduit connected to a liquid supply line, comprising:

an upwardly open vessel located at a position elevationally beneath the monitored area of the structure, said vessel being movably mounted at one end of the vessel about a horizontal pivot axis for motion between an inoperative angular position normally maintained by the empty vessel and an operative angular position assumed by the vessel in response to the reception therein of a predetermined amount of liquid;

drain means leading from the monitored area to the vessel for directing flood water from the monitored area into the vessel at both its inoperative and operative angular positions;

counterweight means mounted to the vessel in opposition to the weight of the vessel and its contents relative to the pivot axis for maintaining the vessel in its inoperative angular position until the predetermined amount of liquid is received therein;

said vessel further including an opening at its remaining end allowing liquid to flow from the vessel when in its operative angular position, the elevation of the opening while the vessel is at its inoperative angular position permitting collection of the predetermined amount of liquid;

discharge means below the vessel for receiving the flow of liquid from the opening of the vessel while the vessel is at its operative angular position;

a liquid supply line operatively connected to the devices or conduits in the structure being monitored;

valve means in said liquid supply line for selectively stopping the flow of liquid therethrough;

and means operatively connected to said vessel and to said valve means causing said valve means to terminate flow of liquid to the liquid supply line in response to movement of said vessel to its operative angular position.

2. The apparatus as set out in claim 1 further comprising:

reset means operatively connected to said vessel for selectively moving said vessel about said pivot axis from its operative position to its normal inoperative position.

3. The apparatus as set out in claim 1 wherein said last-named means comprises control elements operated by the vessel only while the vessel is intermediate its inoperative and operative angular positions about said pivot axis.

4. The apparatus as set out in claim 1 wherein said last-named means comprises control elements operated by the vessel only while the vessel is at its operative angular position about said axis, electrically-operated signal means;

said control elements comprising electrical contacts wired in a control circuit connected to said electrically-operated signal means.

* * * * *